(12) United States Patent
Yoshino et al.

(10) Patent No.: US 11,446,902 B2
(45) Date of Patent: Sep. 20, 2022

(54) PACKAGING MATERIAL FOR MOLDING, EXTERIOR CASE FOR ELECTRICITY STORAGE DEVICE AND ELECTRICITY STORAGE DEVICE

(71) Applicant: SHOWA DENKO PACKAGING CO., LTD., Kanagawa (JP)

(72) Inventors: Kenji Yoshino, Kanagawa (JP); Yuji Minamibori, Kanagawa (JP); Katsumi Tanaka, Kanagawa (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 0 days.

(21) Appl. No.: 16/647,285

(22) PCT Filed: Jun. 28, 2018

(86) PCT No.: PCT/JP2018/024494
§ 371 (c)(1),
(2) Date: Mar. 13, 2020

(87) PCT Pub. No.: WO2019/054008
PCT Pub. Date: Mar. 21, 2019

(65) Prior Publication Data
US 2020/0215795 A1    Jul. 9, 2020

(30) Foreign Application Priority Data

Sep. 14, 2017  (JP) .............................. JP2017-176419

(51) Int. Cl.
*B32B 15/09* (2006.01)
*B32B 7/12* (2006.01)
(Continued)

(52) U.S. Cl.
CPC ................ *B32B 15/09* (2013.01); *B32B 7/12* (2013.01); *B32B 15/20* (2013.01); *B32B 27/36* (2013.01);
(Continued)

(58) Field of Classification Search
None
See application file for complete search history.

(56) References Cited

U.S. PATENT DOCUMENTS

| 9,397,321 B2 * | 7/2016 | Kaibin ..................... B65D 1/34 |
| 2009/0130407 A1 * | 5/2009 | Hata ................. H01M 50/1243 |
| | | 428/213 |

(Continued)

FOREIGN PATENT DOCUMENTS

| CN | 106571432 A | 4/2017 |
| DE | 102014211477 A1 | 12/2014 |

(Continued)

OTHER PUBLICATIONS

International Search Report for PCT/JP2018/024494 dated Sep. 18, 2018.

(Continued)

*Primary Examiner* — Vivian Chen
(74) *Attorney, Agent, or Firm* — Millen White Zelano and Branigan, PC; Csaba Henter (57) ABSTRACT

Provided is a molding packaging material capable of sealing without causing sealing failure, significantly reducing cleaning frequency of a seal bar to improve productivity, and preventing occurrence of delamination. The molding packaging material includes a PBT terephthalate (PBT) layer 2, a heat fusible resin layer 3, and a metal foil layer 4 between the two layers. The PBT layer 2 and the metal foil layer 4 are bonded via an outer adhesive layer 5. The outer adhesive layer 5 is formed of a urethane adhesive cured film com- (Continued)

posed of a polyester polyol, a polyfunctional isocyanate compound, and polyhydric alcohol. The polyester polyol contains a dicarboxylic acid component, the dicarboxylic acid component includes an aromatic dicarboxylic acid. The dicarboxylic acid component contains an aromatic dicarboxylic acid. The content rate of the aromatic dicarboxylic acid in the dicarboxylic acid component is 40 mol % to 80 mol %. The Young's modulus of the cured film of the urethane adhesive is 70 MPa to 400 MPa. The PBT layer has tensile strength of 100 MPa to 300 MPa.

9 Claims, 2 Drawing Sheets

(51) Int. Cl.

| | | |
|---|---|---|
| B32B 27/36 | (2006.01) | |
| C09J 175/06 | (2006.01) | |
| H01M 50/10 | (2021.01) | |
| B32B 37/12 | (2006.01) | |
| B32B 37/16 | (2006.01) | |
| B32B 38/00 | (2006.01) | |
| H01M 50/121 | (2021.01) | |
| H01G 11/78 | (2013.01) | |
| H01M 50/105 | (2021.01) | |
| H01M 50/131 | (2021.01) | |
| C09J 175/04 | (2006.01) | |
| H01M 50/124 | (2021.01) | |
| B65D 65/40 | (2006.01) | |
| H01M 50/116 | (2021.01) | |
| H01M 50/119 | (2021.01) | |
| H01M 50/126 | (2021.01) | |
| H01M 50/129 | (2021.01) | |
| B32B 15/20 | (2006.01) | |

(52) U.S. Cl.
CPC ........... *C09J 175/06* (2013.01); *H01M 50/10* (2021.01); *B32B 37/12* (2013.01); *B32B 37/16* (2013.01); *B32B 38/0036* (2013.01); *B32B 2037/1253* (2013.01); *B32B 2250/03* (2013.01); *B32B 2250/04* (2013.01); *B32B 2307/31* (2013.01); *B32B 2307/50* (2013.01); *B32B 2307/546* (2013.01); *B32B 2307/708* (2013.01); *B32B 2311/24* (2013.01); *B32B 2367/00* (2013.01); *B32B 2439/40* (2013.01); *B32B 2457/10* (2013.01); *B65D 65/40* (2013.01); *C09J 175/04* (2013.01); *C09J 2203/33* (2013.01); *H01G 11/78* (2013.01); *H01M 50/105* (2021.01); *H01M 50/116* (2021.01); *H01M 50/119* (2021.01); *H01M 50/121* (2021.01); *H01M 50/124* (2021.01); *H01M 50/126* (2021.01); *H01M 50/129* (2021.01); *H01M 50/131* (2021.01); *Y10T 428/1355* (2015.01); *Y10T 428/1359* (2015.01); *Y10T 428/1376* (2015.01); *Y10T 428/1383* (2015.01); *Y10T 428/31565* (2015.04); *Y10T 428/31605* (2015.04); *Y10T 428/31681* (2015.04); *Y10T 428/31786* (2015.04)

(56) References Cited

U.S. PATENT DOCUMENTS

| | | | | |
|---|---|---|---|---|
| 2013/0186559 A1* | 7/2013 | Meng | ............... | C08G 18/3243 |
| | | | | 156/281 |
| 2013/0260161 A1* | 10/2013 | Nagae | ............... | H01M 50/124 |
| | | | | 428/480 |
| 2014/0370368 A1* | 12/2014 | Kaibin | ................ | B32B 27/36 |
| | | | | 429/163 |
| 2015/0283790 A1* | 10/2015 | Minamitani | ........... | B32B 27/40 |
| | | | | 428/201 |
| 2015/0380695 A1* | 12/2015 | Hanaki | ............. | C08G 18/6229 |
| | | | | 429/176 |
| 2016/0204394 A1* | 7/2016 | Minamitani | ........ | H01M 50/124 |
| | | | | 429/176 |
| 2016/0372719 A1 | 12/2016 | Amano et al. | | |
| 2017/0033324 A1* | 2/2017 | Maeda | ..................... | B32B 7/12 |
| 2017/0104189 A1* | 4/2017 | He | ........................ | B32B 27/306 |
| 2017/0141362 A1* | 5/2017 | Ijuin | ..................... | H01G 11/78 |
| 2017/0365825 A1* | 12/2017 | Ijuin | ................... | H01M 50/183 |
| 2018/0069203 A1* | 3/2018 | Takahagi | ............... | B32B 15/08 |
| 2019/0198825 A1* | 6/2019 | He | ..................... | H01M 50/124 |
| 2019/0322076 A1* | 10/2019 | He | ................... | H01M 10/0525 |
| 2019/0326564 A1* | 10/2019 | Kouka | ................. | C08G 18/222 |

FOREIGN PATENT DOCUMENTS

| | | | | |
|---|---|---|---|---|
| JP | 2000-123800 A | * | 4/2000 | |
| JP | 2012-146636 A | | 8/2012 | |
| JP | 2012-172091 A | * | 9/2012 | |
| JP | 2015-082354 A | * | 4/2015 | |
| JP | 2016-053167 A | * | 4/2016 | |
| JP | 2016-104565 A | * | 6/2016 | |
| JP | 2017-71414 A | | 4/2017 | |

OTHER PUBLICATIONS

English Abstract for JP-2017071414, Publication Date: Apr. 13, 2017.
English Abstract for JP-2012146636, Publication Date: Aug. 2, 2012.
English Abstract of JP-2016104565, Publication Date: Jun. 9, 2016.
English Abstract for JP-2000-123800, Publication Date: Apr. 28, 2000.
Office Action in corresponding German application 112018005132.3 received Oct. 26, 2021 (pp. 1-11).
Office Action dated Apr. 21, 2021 issued in corresponding Chinese patent application 201880050618.5 (pp. 1-9) and english translation thereof (pp. 1-8).

* cited by examiner

PACKAGING MATERIAL FOR MOLDING, EXTERIOR CASE FOR ELECTRICITY STORAGE DEVICE AND ELECTRICITY STORAGE DEVICE

TECHNICAL FIELD

The present invention relates, for example, to a molding packaging material suitably used as a case for notebook PC, mobile phone, automotive, or stationary rechargeable batteries (lithium-ion rechargeable batteries), and also suitably used as a packaging material for foods and pharmaceutical products.

BACKGROUND ART

With the recent thinning and weight reduction of mobile electrical devices such as smartphones and tablet terminals, as a power storage device packaging material for lithium-ion rechargeable batteries, lithium-polymer rechargeable batteries, lithium-ion ultracapacitors, electric double-layer capacitors, and the like, to be mounted on such mobile electrical devices, instead of a conventional metal can, a laminate composed of a heat-resistant resin layer (outer layer)/an adhesive layer/a metal foil layer/an adhesive layer/a thermoplastic resin layer (inner sealant layer) is used. Further, power sources for electric vehicles, large-scale power sources for power storage applications, ultracapacitors, etc., are also increasingly being packaged with the laminate (packaging material) of the above-mentioned configuration. Stretch forming or deep-drawing is performed on the laminate to form a three-dimensional shape, such as, e.g., a generally rectangular parallelepiped shape. Molding into such a three-dimensional shape ensures a space for accommodating a power storage device main parts.

As the outer layer, a polyamide resin layer is often used in view of securing a strength as a packaging material and securing good formability. For example, a battery case packaging material having a total thickness of 150 μm or less is known in which a polyamide film having a thickness of 9 μm to 50 μm is laminated to at least one side of an aluminum foil and a film capable of providing resistance to electrolytes and having a thickness of at least 9 μm to 50 μm made of polypropylene, maleic acid modified polypropylene, ethylene-acrylate copolymer, or ionomer resin is laminated to the outermost side (see Patent Document 1).

PRIOR ART DOCUMENT

Patent Document

Patent Document 1: Japanese Patent Application Publication No. 2000-123800

SUMMARY OF THE INVENTION

Problem to be Solved by the Invention

By the way, in the heat-sealing process of the power storage device packaging materials, simultaneous sealing is performed in a state in which a tab lead is interposed between opposing edges of the pair of packaging materials. For this reason, the process requires a high temperature, high pressure, and a long time. When the heat-sealing is performed under such a condition, a compound having a low molecular weight contained in the polyamide resin layer is deposited on the surface of the polyamide resin layer during the heat-sealing and is gradually deposited on the seal bar. As a result, when the heat-sealing operation is performed repeatedly, there was a problem that sealing defects are likely to occur due to the deposits (low molecular weight compounds) adhered to the seal bar. There was also a problem that the seal bar must be cleaned frequently to remove the adhered deposits, resulting in reduced productivity.

In order to prevent such sealing defects, it is conceivable to adopt a method of laminating a polyester resin layer on the outer surface of the polyamide resin layer, but there were problems of increasing costs and decreasing formability.

It is also conceivable to adopt a method in which a heat fusible resin layer of the inner layer having a lower melting point is used to lower the heat-sealing temperature. When a heat fusible resin layer having a low melting point is used, however, there is a concern that the thickness after sealing will be reduced, which is hard to achieve sufficient insulation.

In the field of a power storage device such as a battery, it has been required to improve the productivity in order to attain the cost reduction.

The present invention has been made in view of the above-described technical background, and aims to provide a molding packaging material, a power storage device packaging case, and a power storage device capable of being sealed without causing a seal failure during heat-sealing, significantly reducing cleaning frequency of a seal bar to improve productivity, attaining excellent electrolyte resistance, and sufficiently suppressing occurrence of delamination after molding.

Means for Solving the Problems

In order to achieve the aforementioned objects, the present invention provides the following means.

[1] A molding packaging material comprising:
a polybutylene terephthalate layer as an outer layer;
a heat fusible resin layer as an inner layer; and
a metal foil layer arranged between the polybutylene terephthalate layer and the heat fusible resin layer,
wherein the polybutylene terephthalate layer and the metal foil layer are bonded via an outer adhesive layer,
wherein the outer adhesive layer is formed of a cured film of a urethane adhesive containing polyester polyol, a polyfunctional isocyanate compound, and a polyhydric alcohol,
wherein the polyester polyol contains a dicarboxylic acid component,
wherein the dicarboxylic acid component contains aromatic dicarboxylic acid, and a content rate of the aromatic dicarboxylic acid in the dicarboxylic acid component is 40 mol % to 80 mol %,
wherein Young's modulus of the cured film of the urethane adhesive is 70 MPa to 400 MPa, and wherein tensile strength of the polybutylene terephthalate layer is 100 MPa to 300 MPa in a MD direction and 100 MPa to 300 MPa in a TD direction.

[2] The molding packaging material as recited in the aforementioned Item [1], wherein a number average molecular weight of the polyester polyol is in a range of 8,000 to 30,000.

[3] The molding packaging material as recited in the aforementioned Item [1] or [2], wherein the outer adhesive layer includes at least one bond selected from the group consisting of a urethane bond, an ester bond, an urea bond, an allophanate bond, a biuret bond, and an amide bond.

[4] The molding packaging material as recited in any one of the aforementioned Items [1] to [3], wherein in the urethane adhesive, a ratio (equivalence ratio) of a mol number of an isocyanate group of the polyfunctional isocyanate compound to a mol number of a hydroxyl group of the polyester polyol is 2 to 25.

[5] A power storage device packaging case composed of a molded article of the molding packaging material as recited in any one of the aforementioned Items [1] to [4].

[6] A power storage device comprising:
a power storage device main parts; and
a packaging member comprising at least the power storage device packaging case as recited in the aforementioned Item [5],
wherein the power storage device main parts is packaged with the packaging member.

[7] A method of producing a molding packaging material, comprising:
a process of preparing a laminate comprising a polybutylene terephthalate layer as an outer layer, a heat fusible resin layer as an inner layer, and a metal foil layer arranged between the polybutylene terephthalate layer and the heat fusible resin layer, wherein the polybutylene terephthalate layer is formed of a polybutylene terephthalate film having tensile strength of 100 MPa to 300 MPa in an MD direction and 100 MPa to 300 MPa in a TD direction, the heat fusible resin layer and the metal foil layer are bonded via a curing type inner adhesive, and the polybutylene terephthalate layer and the metal foil layer are bonded via a curing type outer adhesive containing polyester polyol, a polyfunctional isocyanate compound, and a polyhydric alcohol; and
an aging treatment process of curing the curing type inner adhesive and the curing type outer adhesive by subjecting the laminate to a heat aging treatment at a temperature of 37° C. to 55° C.,
wherein the polyester polyol contains a dicarboxylic acid component,
wherein the dicarboxylic acid component contains aromatic dicarboxylic acid, and
wherein a content rate of the aromatic dicarboxylic acid in the dicarboxylic acid component is 40 mol % to 80 mol %.

Effects of the Invention

In the invention as recited in the aforementioned Item [1], a polybutylene terephthalate layer is used as an outer layer (substrate layer) and the particular adhesive is used as an outer adhesive layer. Accordingly, compared with a nylon layer commonly used as a substrate layer, the cleaning frequency of the seal bar can be significantly reduced to improve productivity, the electrolyte resistance is excellent, and occurrence of delamination (peeling) after molding can be sufficiently suppressed. Furthermore, the content rate of the aromatic dicarboxylic acid in the dicarboxylic acid component is 40 mol % to 80 mol %, so that occurrence of delamination can be more sufficiently controlled. Further, since the Young's modulus of the cured film of the urethane adhesive is 70 MPa to 400 MPa, it is possible to contribute to formability improvement and further prevent occurrence of delamination. Further, since the tensile strength of the polybutylene terephthalate layer is 100 MPa to 300 MPa in the MD direction and 100 MPa to 300 MPa in the TD direction, it is possible to further improve the formability.

In the invention as recited in the aforementioned Item [2], since the polyester polyol having a number average molecular weight of 8,000 to 30,000 is used, the adhesion strength of the outer adhesive layer can be increased and the formability can also be improved. Accordingly, even if deeper molding is performed, it is possible to sufficiently prevent occurrence of delamination (peeling) between the outer layer and the metal foil layer.

In the invention as recited in the aforementioned Item [3], since the outer adhesive layer contains the particular bond described above, the adhesion strength of the outer adhesive layer can be further increased, and the formability can be improved. Accordingly, even if deeper molding is performed, it is possible to sufficiently prevent delamination (peeling) between the outer layer and the metal foil layer.

In the invention as recited in the aforementioned Item [4], the adhesive reacts sufficiently, so that the delamination between the outer layer and the metal foil layer due to insufficient adhesion can be sufficiently prevented.

In the invention as recited in the aforementioned Item [5], it is possible to provide a power storage device packaging case capable of being sealed in good condition and sufficiently suppressing occurrence of delamination.

In the invention as recited in the aforementioned Item [6], it is possible to provide a power storage device configured using a packaging case capable of being sealed in good condition and sufficiently suppressing occurrence of delamination.

According to the invention (production method) as recited in the aforementioned Item [7], it is possible to produce a molding packaging material capable of performing heat-sealing without causing a seal failure, significantly reducing cleaning frequency of a seal bar, improving productivity, and sufficiently reducing occurrence of delamination (peeling) after molding.

EMBODIMENTS FOR CARRYING OUT THE INVENTION

Figure 1:
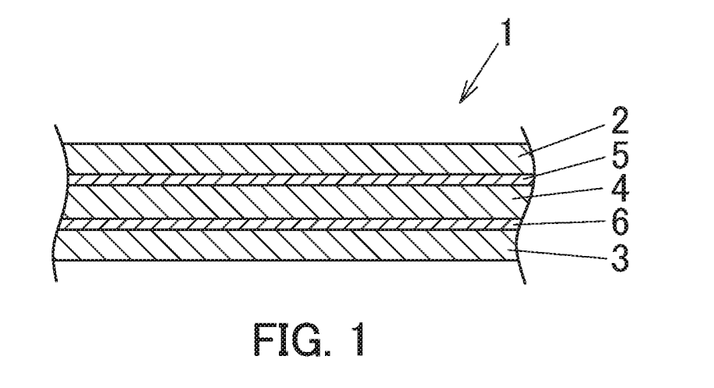
FIG. 1 is a cross-sectional view illustrating an embodiment of a molding packaging material according to the present invention.

An embodiment of a molding packaging material 1 according to the present invention is shown in FIG. 1. This molding packaging material 1 is used as a packaging material for batteries such as lithium-ion secondary batteries. The molding packaging material 1 is subjected to molding, such as, e.g., deep-drawing and stretch forming, and used as a molded case 10 (see FIG. 3).

The molding packaging material 1 has a configuration in which a polybutylene terephthalate layer (outer layer) 2 is integrally laminated to one side (upper surface) of a metal foil layer 4 via an outer adhesive layer (first adhesive layer) 5, and a heat fusible resin layer (inner layer) 3 is integrally laminated to the other side (lower surface) of the metal foil layer 4 via an inner adhesive layer (second adhesive layer) 6 (see FIG. 1).

In the present invention, the outer layer 2 is a member primarily for ensuring good formability as a packaging material 1. In the present invention, the outer layer 2 is formed of a polybutylene terephthalate layer. In the present invention, as the polybutylene terephthalate film composing the polybutylene terephthalate layer, a polybutylene terephthalate film having tensile strength of 100 MPa to 300 MPa in the MD direction and tensile strength of 100 MPa to 300 MPa in the TD direction is used. Forming the polybutylene terephthalate layer (outer layer) 2 provided with such characteristics, the formability can be improved. In particular, as the polybutylene terephthalate film composing the polybutylene terephthalate layer, it is preferable to use a polybutylene terephthalate film having tensile strength of 100 MPa to 200 MPa in the MD direction and tensile strength of 100 MPa to 200 MPa in the TD direction. Note that the term "MD direction" refers to a winding direction (flow direction: Machine Direction) in a rolled film, and the term "TD direction" refers to a width direction (direction perpendicular to the flow direction: Transverse Direction) in a roll-like film.

Preferably, the thickness of the polybutylene terephthalate layer (outer layer) 2 is 10 μm to 80 μm. When the thickness is set to the above-described preferred lower limit or higher, a sufficient strength can be secured as a packaging material. On the other hand, when the thickness is set to the above-described preferred upper limit or lower, the stress during stretch forming or drawing can be reduced to improve the formability. In particular, more preferably, the thickness of the polybutylene terephthalate layer 2 is 15 μm and 50 μm.

In the present invention, the outer adhesive layer (first adhesive layer) 5 is formed of a cured layer of a urethane adhesive containing polyester polyol, a polyfunctional isocyanate compound, and polyhydric alcohol.

The polyester polyol is obtained, for example, by combining an alcohol and a carboxylic acid to carry out a polycondensation reaction. That is, the polyester polyol is a condensed polymer of an alcohol component and a carboxylic acid component. For example, the polyester polyol can be produced by combining a polyhydric alcohol and a dicarboxylic acid to carry out the polycondensation reaction at 210° C. for 20 hours. As the polyhydric alcohol, although not specifically limited, neopentyl glycol, ethylene glycol, 1,6-hexanediol, and the like, can be exemplified. As the carboxylic acid, although not specifically limited, a dicarboxylic acid, such as, e.g., an aliphatic dicarboxylic acid and an aromatic dicarboxylic acid, can be exemplified. As the aliphatic dicarboxylic acid, although not specifically limited, adipic acid, succinic acid, adipic acid, suberic acid, sebacic acid, and the like, can be exemplified. As the aromatic dicarboxylic acid, although not specifically limited, isophthalic acid, terephthalic acid, naphthalene dicarboxylic acid, phthalic anhydride, and the like, can be exemplified.

Preferably, the polyester polyol contains aromatic dicarboxylic acid as the dicarboxylic acid component. Preferably, the content rate of the aromatic dicarboxylic acid in the dicarboxylic acid component is 40 mol % to 80 mol %. When the content rate is 40 mol % or more, even in the case of performing deep molding, it is possible to more sufficiently prevent occurrence of delamination (peeling) between the outer layer 2 and the metal foil layer 4. When the content rate is 80 mol % or less, it is possible to sufficiently secure the adhesion of the outer adhesive agent (first adhesive) 5. In particular, more preferably, the content rate of the aromatic dicarboxylic acid in the dicarboxylic acid moiety is 50 mol % to 70 mol %.

As the polyester polyol, although not specifically limited, it is preferably use polyester polyol having a number average molecular weight in the range of 8,000 to 30,000. When the number average molecular weight is 8,000 or more, it is possible to further increase the adhesion strength of the outer adhesive layer, and when the number average molecular weight is 30,000 or less, the formability can also be improved. In particular, the number average molecular weight of the polyester polyol is particularly preferred in the range of 10,000 to 26,000.

As the polyfunctional isocyanate compound (curing agent), various polyfunctional isocyanate compounds of the aliphatic, alicyclic, and aromatic systems can be used. As the aliphatic polyfunctional isocyanate compound, for example, hexamethylene diisocyanate (HMDI) can be exemplified. As the alicyclic polyfunctional isocyanate compound, for example, isophorone diisocyanate (IPDI) can be exemplified. As the aromatic polyfunctional isocyanate compound, for example, trilene diisocyanate (TDI) and diphenylmethane diisocyanate (MDI) can be exemplified. Modifications of these polyfunctional isocyanate compounds may also be used, and examples thereof include polyfunctional isocyanate modifications by multimerization reactions such as isocyanuration, carbodiimidation, polymerization, and the like.

The polyhydric alcohol is an alcohol having two or more alcoholic hydroxyl groups per molecule. As the polyhydric alcohol, although not specifically limited, trimethylol propane (TMP), methylpentanediol, dimethylbutanediol, ethylene glycol, glycerine, carbitol, sorbitol, and the like, can be exemplified. The alcoholic hydroxyl group is a functional group capable of reacting with the isocyanate group.

In the outer adhesive layer 5, the ratio of the mol number of isocyanate groups (NCO) of the polyfunctional isocyanate compound to the mol number of hydroxyl groups (OH) of the polyester polyol (equivalence ratio [NCO]/[OH]) is preferably set in the range of 2 to 25. In particular, the equivalence ratio [NCO]/[OH] is particularly preferably set in the range of 5 to 20.

Preferably, the thickness (post-dry thickness) of the outer adhesive layer (first adhesive layer) 5 is set to 1 μm to 6 μm.

The Young's modulus of the cured film of the urethane adhesive composing the outer adhesive layer 5 should be in the range of 70 MPa to 400 MPa. Since the Young's modulus is 70 MPa or more, the heat resistance of the outer adhesive layer 5 can be improved, and the laminate strength can be improved sufficiently under high temperature environments. Since the Young's modulus is 400 MPa or less, the adhesion of the urethane adhesive hardened film can be sufficiently improved to prevent occurrence of delamination between the outer layer 2 and the metal foil layer 4 even in the case of performing deep molding. In particular, it is particularly preferred that the Young's modulus of the urethane adhesive cured film composing the outer adhesive layer 5 be in the range of 140 MPa to 300 MPa. Note that the Young's modulus is Young's modulus measured in accordance with JIS K7127-1999.

In the present invention, the metal foil layer 4 serves to impart a gas barrier property to prevent oxygen or moisture from entering the molding packaging material 1. As the metal foil layer 4, although not specifically limited, for example, an aluminum foil, a copper foil, and an iron foil can be exemplified, and an aluminum foil is commonly used. Preferably, the thickness of the metal foil layer 4 is 5 μm and 150 μm. When the thickness is 5 μm or more, it is possible to prevent occurrence of pinholes during rolling when producing the metal foil, and when the thickness is 150 μm or less, it is possible to reduce the stress during molding, such as, e.g., stretch molding and draw molding, to improve the formability. In particular, more preferably, the thickness of the metal foil layer 4 is 20 μm to 100 μm.

Preferably, in the metal foil layer 4, at least the inner surface (the inner adhesive layer 6 side) thereof is subjected to a chemical conversion treatment. The application of such a chemical conversion treatment sufficiently prevents corrosion of the metal foil surface due to the contents (electrolytes of a battery, etc.). For example, the metal foil is subjected to a chemical conversion treatment by performing the following treatment. That is, for example, a chemical conversion treatment is applied to a surface of a metal foil to which a degreasing treatment has been performed by coating any one of aqueous solutions 1) to 3) listed below and then drying it.

1) an aqueous solution of a mixture containing:
phosphoric acid;
chromic acid; and
at least one compound selected from the group consisting of a metal salt of fluoride and a non-metal salt of fluoride 2) an aqueous solution of a mixture containing:
phosphoric acid;
at least one resin selected from the group consisting of an acrylic resin, a chitosan derivative resin, and a phenolic resin; and
at least one compound selected from the group consisting of chromic acid and chromic (III) salt 3) an aqueous solution of a mixture containing:
phosphoric acid;
at least one resin selected from the group consisting of an acrylic resin, a chitosan derivative resin, and a phenolic resin;
at least one compound selected from the group consisting of chromic acid and chromic (III) salt; and
at least one compound selected from the group consisting of a metal salt of fluoride and a non-metal salt of fluoride The chemical coating film is preferably 0.1 mg/m$^2$ to 50 mg/m$^2$, especially preferably 2 mg/m$^2$ to 20 mg/m$^2$, as a chromic deposition amount (per side).

The heat fusible resin layer (inner layer; sealant layer) 3 plays a role of providing excellent chemical resistance against a highly corrosive electrolytic solution used in a lithium ion secondary battery, etc., and also plays a role of imparting heat sealability to the molding packaging material.

As the resin composing the heat fusible resin layer 3, although not specifically limited, for example, polyethylene, polypropylene, ionomer, ethylene ethyl acrylate (EEA), ethylene methyl acrylate (EMA), an ethylene methyl methacrylate resin (EMMA), an ethylene-vinyl acetate copolymer resin (EVA), a maleic anhydride modified polypropylene, and maleic anhydride modified polyethylene can be exemplified.

The thickness of the heat fusible resin layer 3 is preferably set to 20 μm to 150 μm. When the thickness is set to 20 μm or more, it is possible to secure a sufficient heat-seal strength, and when the thickness is set to 150 μm or less, it is possible to contribute to the thinning and weight saving. In particular, more preferably, the thickness of the heat fusible resin layer 3 is set to 30 μm to 100 μm. Preferably, the heat fusible resin layer 13 is formed of a heat fusible resin non-stretched film layer. The heat fusible resin layer 13 may be a single layer or a multi-layer.

As the inner adhesive layer (second adhesive layer) 6, although not specifically limited, it is preferable to use, for example, a curing type adhesive. As the curing type adhesive, for example, a thermosetting type acrylic adhesive, a thermosetting type acid-modified polypropylene adhesive, and a thermosetting type polyurethane-based adhesive can be exemplified. Among them, a thermosetting type acrylic adhesive is preferably used. In this case, the heat aging treatment temperature for accelerating curing can be lowered (e.g., 40° C.), which in turn can obtain an effective effect of sufficiently preventing occurrence of white powder of the heat fusible resin layer 3 due to the heat aging treatment. Preferably, the thickness (post-dry thickness) of the inner adhesive layer 6 is set to 1 μm to 4 μm.

Figure 2:
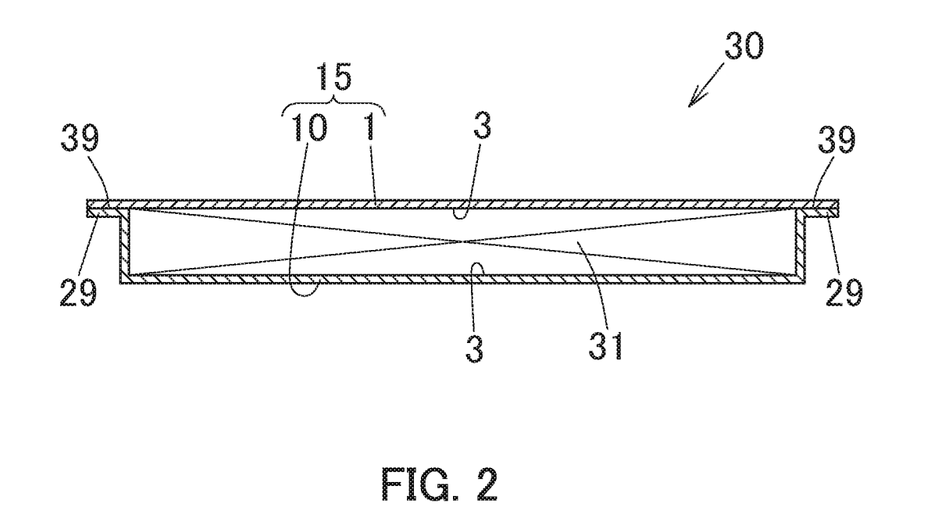
FIG. 2 is a cross-sectional view illustrating an embodiment of a power storage device according to the present invention.
Figure 3:
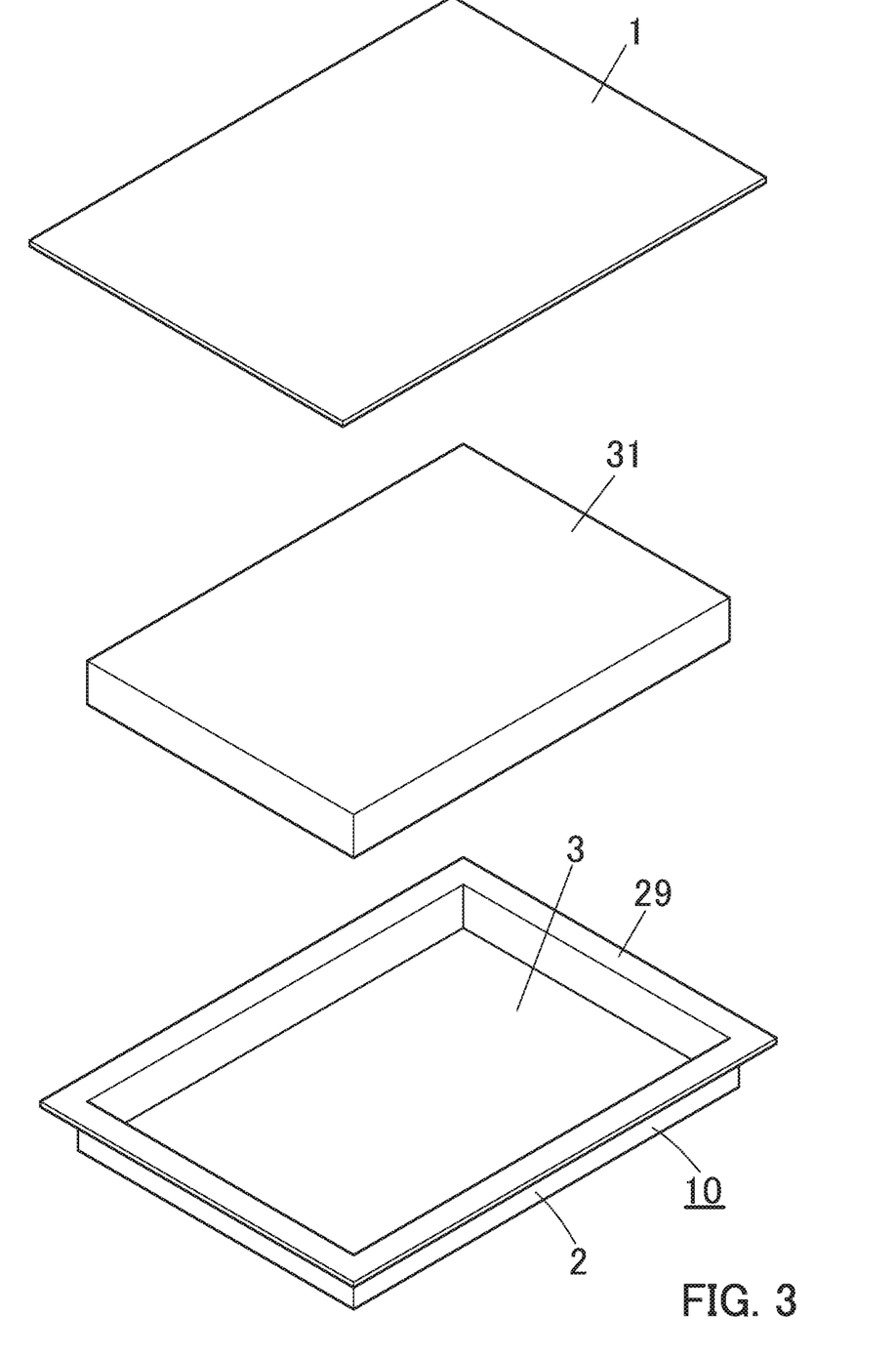
FIG. 3 is a perspective view showing a (planar) packaging material, a power storage device main parts, and a case (three-dimensionally shaped molded article) constituting the power storage device shown in FIG. 2 in a separate state prior to heat-sealing.

By molding (deep-drawing, stretch forming, etc.) the molding packaging material 1 of the present invention, a packaging case (battery case, etc.) 10 can be obtained (see FIG. 2 and FIG. 3).

An embodiment of a power storage device 30 configured using the molding packaging material 1 of the present invention is shown in FIG. 2. This power storage device 30 is a lithium-ion secondary battery. In this embodiment, as shown in FIG. 2 and FIG. 3, the packaging member 15 is configured by a packaging case 10 obtained by molding the packaging material 1 and a planar packaging material 1 obtained by not subjected to molding. The power storage device 30 of the present invention is configured as follows (see FIG. 2 and FIG. 3). That is, a power storage device main parts (electrochemical element, etc.) 31 having a generally rectangular parallelepiped shape is accommodated in an accommodation recess of the packaging case 10 obtained by molding the packaging material 1 of the present invention. The planar packaging material 1 is arranged on the power storage device main parts 31 with the inner layer 3 facing inwardly (downwardly). In this state, the peripheral portion of the inner layer 3 (innermost layer 7) of the planar outer member 1 and the flange portion (sealing flange portion) 29 of the packaging case 10 are heat-sealed. Note that the inner surface of the accommodation recess of the packaging case 10 is configured by the inner layer 3 (innermost layer 7), and the outer surface of the accommodation recess is configured by the substrate layer (outer layer) 2 (see FIG. 3).

In FIG. 2, the reference numeral "39" denotes a heat seal portion in which the peripheral portion of the packaging material 1 and the flange portion (sealing peripheral portion) 29 of the packaging case 10 are bonded (welded). Note that, in the power storage device 30, the tip end portion of the tab lead connected to the power storage device main parts 31 is, though not illustrated here, red out to the outside of the packaging member 15.

As the power storage device main parts 31, although not specifically limited, for example, a battery main parts portion, an ultracapacitor main parts portion, a capacitor main parts portion, and the like, can be exemplified.

Preferably, the width of the heat seal portion 39 is set to 0.5 mm or more. When the width is set to 0.5 mm or more, it is possible to assuredly perform the sealing. In particular, the width of the heat seal portion 39 is preferably set to 3 mm and 15 mm.

In the above-described embodiment, the packaging member 15 is composed of the packaging case 10 formed by molding the packaging material 1 and the planar packaging material 1 (see FIGS. 2 and 3). However, the packaging member 15 is not specifically limited to such a combination. For example, the packaging member 15 may be composed of a pair of packaging cases 10.

Next, a method of producing the molding packaging material according to the present invention will be described.

First, a laminate is prepared (preparation process). This laminate is composed of a polybutylene terephthalate (layer) 2 having tensile strength of 100 MPa to 300 MPa in the MD direction and 100 MPa to 300 MP in the TD direction and a heat fusible resin layer (inner layer) 3, and a metal foil layer 4 arranged between both the layers. The heat fusible resin layer 3 and the metal foil layer 4 are bonded via a curing type inner adhesive. The polybutylene terephthalate layer 2 and the metal foil layer 4 are bonded via a thermal curing type outer adhesive containing a polyester polyol, a polyfunctional isocyanate compound, and a polyhydric alcohol.

As the polyfunctional isocyanate compound and as the polyhydric alcohol, what materials are used as the polyester polyol are described above.

Note that as the curing type inner adhesive, although not specifically limited, a thermosetting type acrylic adhesive, a thermosetting type acid modified polypropylene adhesive, a thermosetting type polyurethane-based adhesive, and the like, can be exemplified. Among them, a thermosetting type acrylic adhesive is preferably used.

Then, the curing type inner adhesive and the curing type outer adhesive in the laminate are cured. Preferably, the laminate is subjected to a heat treatment at a temperature in the range of 37° C. to 55° C. to cure the curing type inner adhesive and the curing type outer adhesive (aging treatment process). The molding packaging material 1 of the present invention can be obtained via the aging treatment process. The heat treatment is particularly preferably carried out at 38° C. to 52° C.

Although the time of the heat treatment (heat aging treatment) is not specifically limited, in the case of using a thermosetting type acrylic adhesive as a curing type inner adhesive, the heat treatment is preferably performed for 3 days to 15 days. In the case of using a thermosetting type acid-modified polypropylene adhesive as the curing type inner adhesive, the heat treatment is preferably performed for 3 days to 15 days. In the case of using a thermosetting type polyurethane-based adhesive as the curing type inner adhesive, the heat treatment is preferably performed for 3 days to 15 days.

EXAMPLES

Next, specific embodiments of the present invention will be described, but it should be noted that the present invention is not specifically limited to these embodiments.

Example 1

A chemical conversion treatment liquid composed of phosphoric acid, polyacrylic acid (acrylic resin), a chromium (III) salt compound, water, and an alcohol was applied to both sides of an aluminum foil (aluminum foil A8079 defined by JIS H4160) 4 having a thickness of 35 µm, and then dried at 180° C. to form a chemical conversion coating. The chromic deposition amount of this chemical conversion coating was 10 mg/m² per side.

Next, on one side of the chemical conversion treated aluminum foil 4, a thermal curing type outer adhesive containing 100 parts by mass of polyester polyol having a number average molecular weight of 15,000, 25 parts by mass of trilene diisocyanate (TDI), 10 parts by mass of trimethylol propane (TMP) was applied as an outer adhesive agent (layer) 5 so that the mass after drying became 3.5 g/m².

The polyester polyol is polyester polyol obtained by mixing a dicarboxylic acid component composed of 40 mol parts of adipic acid (aliphatic dicarboxylic acid) and 60 mol parts of isophthalic acid (aromatic dicarboxylic acid) and a polyhydric alcohol component composed of 30 mol parts of neopentyl glycol, 30 mol parts of ethylene glycol, and 40 mol parts of 1,6-hexanediol and subjecting the mixture to a polycondensation reaction at 210° C. for 20 hours. Accordingly, the content rate of the aromatic dicarboxylic acids in the dicarboxylic acid component is 60 mol %.

Also, in the thermal curing type outer adhesive, the ratio of the mol number of the isocyanate group (NCO) of the trilene diisocyanate (TDI) to the mol number of the hydroxyl group (OH) of the polyester polyol ([equivalence ratio NCO/OH]) was 10.

A biaxially stretched polybutylene terephthalate film (25 µm thickness) 2 having tensile strength of 190 MPa in the MD direction and tensile strength of 180 MPa in the TD direction was laminated to the outer adhesive agent coating surface as one side of the aluminum foil 4.

Next, on the other side of the aluminum foil 4, an inner adhesive composed of a thermosetting type acrylic adhesive was applied so that the mass after drying became 2.5 g/m². After the application, a non-stretched polypropylene film 3 having a thickness of 40 µm was laminated to the inner adhesive coating surface. Thus, a laminated was obtained.

The laminate was allowed to stand at 40° C. for 9 days to perform a heat aging treatment to simultaneously cure the thermal curing type outer adhesive and the curing type inner adhesive to form the outer adhesive layer 5 and the inner adhesive layer 6. Thus, the molding packaging material 1 of the configuration shown in FIG. 1 was obtained.

Example 2

A molding packaging material 1 of the configuration shown in FIG. 1 was obtained in the same manner as in Example 1 except that as the dicarboxylic acid component, 100 parts by mass of polyester polyol having the number average molecular weight of 12,000 obtained using dicarboxylic acid components composed of 55 mol parts of adipic acid (aliphatic dicarboxylic acid) and 45 mol parts of isophthalic acid (aromatic dicarboxylic acid).

Example 3

A molding packaging material 1 of the configuration shown in FIG. 1 was obtained in the same manner as in Example 1 except that as a dicarboxylic acid component, 100 parts by mass of polyester polyol having the number average molecular weight of 24,000 obtained using a dicarboxylic acid component composed of 25 mol parts of adipic acid (aliphatic dicarboxylic acid) and 75 mol parts of isophthalic acid (aromatic dicarboxylic acid).

Example 4

A molding packaging material 1 of the configuration shown in FIG. 1 was obtained in the same manner as in Example 2 except that 100 parts by mass of 9,000 polyester polyol having the number average molecular weight of 9,000 was used.

Example 5

A molding packaging material 1 having the configuration shown in FIG. 1 was obtained in the same manner as in Example 3 except that 100 parts by mass of polyester polyol having the number average molecular weight of 29,000 was used.

Example 6

A molding packaging material 1 having the configuration shown in FIG. 1 was obtained in the same manner as in Example 1 except that as a dicarboxylic acid component, 100 parts by mass of polyester polyol having the number average molecular weight of 5,000 obtained by using a dicarboxylic acid component composed of 50 mol parts of adipic acid (aliphatic dicarboxylic acid) and 50 mol parts of isophthalic acid (aromatic dicarboxylic acid) was used.

Example 7

A molding packaging material 1 of the configuration shown in FIG. 1 was obtained in the same manner as in Example 1 except that as a dicarboxylic acid component, 100 parts by mass of polyester polyol having the number average molecular weight of 8,000 obtained using a dicarboxylic acid component composed of 45 mol parts of adipic acid (aliphatic dicarboxylic acid) and 55 mol parts of isophthalic acid (aromatic dicarboxylic acid).

Example 8

A molding packaging material 1 of the configuration shown in FIG. 1 was obtained in the same manner as in Example 1 except that as a dicarboxylic acid component, 100 parts by mass of polyester polyol having the number average molecular weight of 28,000 obtained from a dicarboxylic acid component composed of 30 mol parts of adipic acid (aliphatic dicarboxylic acid) and 70 mol parts of isophthalic acid (aromatic dicarboxylic acid).

Example 9

A molding packaging material 1 of the configuration shown in FIG. 1 was obtained in the same manner as in Example 1 except that as a dicarboxylic acid component, 100 parts by mass of polyester polyol having the number average molecular weight of 32,000 obtained using a dicarboxylic acid component consisting of 25 mol parts of adipic acid (aliphatic dicarboxylic acid) and 75 mol parts of isophthalic acid (aromatic dicarboxylic acid) was used.

Example 10

A molding packaging material 1 of the configuration shown in FIG. 1 was obtained in the same manner as in Example 1 except that the equivalence ratio [NCO]/[OH] was changed to 5.

Example 11

A molding packaging material 1 of the configuration shown in FIG. 1 was obtained in the same manner as in Example 1 except that the equivalence ratio [NCO]/[OH] was changed to 20.

Example 12

A molding packaging material 1 of the configuration shown in FIG. 1 was obtained in the same manner as in Example 1 except that 10 parts by mass of ethylene glycol (EG) was used instead of 10 parts by mass of trimethylol propane (TMP).

Example 13

A molding packaging material 1 of the configuration shown in FIG. 1 was obtained in the same manner as in Example 1 except that 10 parts by mass of glycerin was used instead of 10 parts by mass of trimethylol propane (TMP).

Example 14

A molding packaging material 1 of the configuration shown in FIG. 1 was obtained in the same manner as in Example 1 except that 25 parts by mass of diphenylmethane diisocyanate (MDI) was used instead of 25 parts by mass of trilene diisocyanate (TDI).

Comparative Example 1

A molding packaging material of the configuration shown in FIG. 1 was obtained in the same manner as in Example 1 except that instead of a biaxially stretched polybutylene terephthalate film having tensile strength of 190 MPa in the MD direction and tensile strength of 180 MPa in the TD direction, a biaxially stretched nylon film having tensile strength of 250 MPa in the MD direction and tensile strength of 290 MPa in the TD direction was used.

Comparative Example 2

A molding packaging material of the configuration shown in FIG. 1 was obtained in the same manner as in Example 1 except that instead of a biaxially stretched polybutylene terephthalate film having tensile strength of 190 MPa in the MD direction and tensile strength of 180 MPa in the TD direction, a polyethylene terephthalate film having tensile strength of 240 MPa in the MD direction and tensile strength of 240 MPa in the MD direction.

Comparative Example 3

A molding packaging material of the configuration shown in FIG. 1 was obtained in the same manner as in Example 1 except that as a dicarboxylic acid component, 100 parts by mass of polyester polyol having the number average molecular weight of 9,000 obtained using a dicarboxylic acid component composed of 70 mol parts of adipic acid (aliphatic dicarboxylic acid) and 30 mol parts of isophthalic acid (aromatic dicarboxylic acid).

Comparative Example 4

A molding packaging material of the configuration shown in FIG. 1 was obtained in the same manner as in Example 1 except that as a dicarboxylic acid component, 100 parts by mass of polyester polyol having the number average molecular weight of 28,000 obtained using a dicarboxylic acid component composed of 10 mol parts of adipic acid (aliphatic dicarboxylic acid) and 90 mol parts of isophthalic acid (aromatic dicarboxylic acid).

Comparative Example 5

A molding packaging material of the configuration shown in FIG. 1 was obtained in the same manner as in Example 1 except that as a dicarboxylic acid component, 100 parts by mass of polyester polyol having the number average molecular weight of 10,000 obtained using a dicarboxylic acid component composed of 50 mol parts of adipic acid (aliphatic dicarboxylic acid) and 50 mol parts of isophthalic acid (aromatic dicarboxylic acid) was used.

Comparative Example 6

A molding packaging material of the configuration shown in FIG. 1 was obtained in the same manner as in Example 1 except that as a dicarboxylic acid component, 100 parts by mass of polyester polyol having the number average molecular weight of 20,000 obtained using a dicarboxylic acid component composed of 30 mol parts of adipic acid (aliphatic dicarboxylic acid) and 70 mol parts of isophthalic acid (aromatic dicarboxylic acid).

Comparative Example 7

A molding packaging material was obtained in the same manner as in Example 1 except that as an outer adhesive agent, a thermosetting type olefinic outer adhesive containing an acid-modified polyolefin resin was used.

Comparative Example 8

A molding packaging material was obtained in the same manner as in Example 1 except that as an outer adhesive, a thermosetting type acrylic outer adhesive containing a methacrylate-based resin was used.

Comparative Example 9

A molding packaging material was obtained in the same manner as in Example 1 except that as an outer adhesive, a thermosetting type epoxy outer adhesive containing a bisphenol A type epoxy resin was used.

Comparative Example 10

A molding packaging material was obtained in the same manner as in Example 1 except that instead of a biaxially stretched polybutylene terephthalate film having tensile strength of 190 MPa in the MD direction and tensile strength of 180 MPa in the TD direction, a polybutylene terephthalate film having tensile strength of 70 MPa in the MD direction and tensile strength of 70 MPa in the TD direction was used.

Comparative Example 11

A molding packaging material was obtained in the same manner as in Example 1 except that instead of a biaxially stretched polybutylene terephthalate film having tensile strength of 190 MPa in the MD direction and tensile strength of 180 MPa in the TD direction, a biaxially stretched polybutylene terephthalate film having tensile strength of 340 MPa in the MD direction and tensile strength of 340 MPa in the TD direction was used.

Note that the "Young's modulus of the cured film of the outer adhesive" and the "tensile strength of polybutylene terephthalate layer" shown in Table 1 were measured by the following method.

<Young's Modulus Measurement Method>

The Young's modulus (MPa) of the thermoset cured film of each outer adhesive used in Examples and Comparative Examples was measured in accordance with JIS K7127-1999. Specifically, each outer adhesive was applied to a glass plate at a thickness of 50 μm, followed by a heat aging treatment at 40° C. for 11 days to thermoset the outer adhesive. Thus, a cured article having a thickness of 46 μm was obtained. After the cured article was peeled off from the glass plate, and cut into a size of 15 mm in width×100 mm in length to prepare a test piece. The test piece was subjected to a tensile test at a tensile rate of 200 mm/min using a Strograph (AGS-5 kNX) manufactured by Shimadzu Corporation to measure the Young's modulus (MPa).

<Measuring Polybutylene Terephthalate Layer Tensile Strength>

The polybutylene terephthalate resin (for forming the outer layer) used in Examples and Comparative Examples was extruded into a film having a thickness of a 25 μm. Thereafter, this polybutylene terephthalate film was cut along each direction of the TD direction and the MD direction into test pieces of 150 mm in length×10 mm in width. The test pieces each were subjected to a tensile test at a chuck interval of 100 mm and a test rate of 200 mm/min in accordance with JIS K7127-1999 to obtain the tensile strength (MPa).

TABLE 1

| | Outer adhesive | | | | | | | Outer layer (substrate layer) | | |
|---|---|---|---|---|---|---|---|---|---|---|
| | Resin (type) | Content rate of aromatic dicarboxylic acid (mol %) | Number average molecular weight of polyester polyol | Equivalent ratio [NCO/OH] | Polyfunctional isocyanate compound | Polyalcohol | Young's modulus of cured film (MPa) | Resin type | Tensile strength (MD direction) (MPa) | Tensile strength (TD direction) (MPa) |
| Ex. 1 | Urethan | 60 | 15000 | 10 | TDI | TMP | 200 | PBT | 190 | 180 |
| Ex. 2 | Urethan | 45 | 12000 | 10 | TDI | TMP | 180 | PBT | 190 | 180 |
| Ex. 3 | Urethan | 75 | 24000 | 10 | TDI | TMP | 240 | PBT | 190 | 180 |
| Ex. 4 | Urethan | 45 | 9000 | 10 | TDI | TMP | 80 | PBT | 190 | 180 |
| Ex. 5 | Urethan | 75 | 29000 | 10 | TDI | TMP | 380 | PBT | 190 | 180 |
| Ex. 6 | Urethan | 50 | 5000 | 10 | TDI | TMP | 160 | PBT | 190 | 180 |
| Ex. 7 | Urethan | 55 | 8000 | 10 | TDI | TMP | 200 | PBT | 190 | 180 |
| Ex. 8 | Urethan | 70 | 28000 | 10 | TDI | TMP | 200 | PBT | 190 | 180 |
| Ex. 9 | Urethan | 75 | 32000 | 10 | TDI | TMP | 260 | PBT | 190 | 180 |
| Ex. 10 | Urethan | 60 | 15000 | 5 | TDI | TMP | 220 | PBT | 190 | 180 |
| Ex. 11 | Urethan | 60 | 15000 | 20 | TDI | TMP | 210 | PBT | 190 | 180 |
| Ex. 12 | Urethan | 60 | 15000 | 10 | TDI | EG | 170 | PBT | 190 | 180 |
| Ex. 13 | Urethan | 60 | 15000 | 10 | TDI | Glycerin | 210 | PBT | 190 | 180 |
| Ex. 14 | Urethan | 60 | 15000 | 10 | MDI | TMP | 190 | PBT | 190 | 180 |
| Comp. Ex. 1 | Urethan | 60 | 15000 | 10 | TDI | TMP | 200 | Nylon | 250 | 290 |
| Comp. Ex. 2 | Urethan | 60 | 15000 | 10 | TDI | TMP | 200 | PET | 240 | 240 |
| Comp. Ex. 3 | Urethan | 30 | 9000 | 10 | TDI | TMP | 80 | PBT | 190 | 180 |
| Comp. Ex. 4 | Urethan | 90 | 28000 | 10 | TDI | TMP | 300 | PBT | 190 | 180 |
| Comp. Ex. 5 | Urethan | 50 | 10000 | 10 | TDI | TMP | 60 | PBT | 190 | 180 |
| Comp. Ex. 6 | Urethan | 70 | 20000 | 10 | TDI | TMP | 450 | PBT | 190 | 180 |
| Comp. Ex. 7 | Olefin | — | — | — | TDI | TMP | 230 | PBT | 190 | 180 |
| Comp. Ex. 8 | Acrylic | — | — | — | TDI | TMP | 210 | PBT | 190 | 180 |
| Comp. Ex. 9 | Epoxy | — | — | — | TDI | TMP | 180 | PBT | 190 | 180 |

TABLE 1-continued

| | Outer adhesive | | | | | | Outer layer (substrate layer) | | |
|---|---|---|---|---|---|---|---|---|---|
| | Resin (type) | Content rate of aromatic dicarboxylic acid (mol %) | Number average molecular weight of polyester polyol | Equivalent ratio [NCO/OH] | Poly- functional isocyanate compound | Poly- alcohol | Young's modulus of cured film (MPa) | Resin type | Tensile strength (MD direction) (MPa) | Tensile strength (TD direction) (MPa) |
| Comp. Ex. 10 | Urethan | 60 | 15000 | 10 | TDI | TMP | 200 | PBT | 70 | 70 |
| Comp. Ex. 11 | Urethan | 60 | 15000 | 10 | TDI | TMP | 200 | PBT | 340 | 340 |

TABLE 2

| | Evaluation results | | |
|---|---|---|---|
| | Formability | Appearance characteristics after sealing (presence or absence of peeling) | Heat-resistant |
| Ex. 1 | ○ | ○ | ○ |
| Ex. 2 | ○ | ○ | ○ |
| Ex. 3 | ○ | ○ | ○ |
| Ex. 4 | ○ | Δ | ○ |
| Ex. 5 | Δ | ○ | ○ |
| Ex. 6 | ○ | Δ | ○ |
| Ex. 7 | ○ | ○ | ○ |
| Ex. 8 | ○ | ○ | ○ |
| Ex. 9 | Δ | ○ | ○ |
| Ex. 10 | ○ | ○ | ○ |
| Ex. 11 | ○ | ○ | ○ |
| Ex. 12 | ○ | ○ | ○ |
| Ex. 13 | ○ | ○ | ○ |
| Ex. 14 | ○ | ○ | ○ |
| Comp. Ex. 1 | ○ | ○ | X |
| Comp. Ex. 2 | X | ○ | ○ |
| Comp. Ex. 3 | ○ | X | ○ |
| Comp. Ex. 4 | Δ | X | ○ |
| Comp. Ex. 5 | ○ | X | ○ |
| Comp. Ex. 6 | X | ○ | ○ |
| Comp. Ex. 7 | X | ○ | ○ |
| Comp. Ex. 8 | X | ○ | ○ |
| Comp. Ex. 9 | X | ○ | ○ |
| Comp. Ex. 10 | X | ○ | ○ |
| Comp. Ex. 11 | ○ | X | Δ |

Each molding packaging material obtained as described above was evaluated based on the following assessment method.

<Formability Assessment Method>

The deep-drawing was performed on the molding packaging material using a deep-drawing tool manufactured by Amada Co., Ltd., into an approximately rectangular parallelepiped shape (approximately rectangular parallelepiped shape with one surface opened) of 55 mm in length×35 mm in width×each depth. That is, the deep drawing was performed while changing the molding depth. The presence or absence of pinholes and cracks in the corners of the obtained molded article was investigated. The "maximum molding depth (mm)" which did not cause pinholes and cracks was examined and evaluated based on the following determination criteria. The presence or absence of pinholes or cracks was investigated by a light transmission method in a dark room.

(Determination Criteria)

"○": maximum molding depth not causing pinholes and cracks was 5 mm or more

"Δ": maximum molding depth not causing pinholes and cracks was 3.5 mm or more and less than 5 mm "X": maximum molding depth not causing pinholes and cracks was less than 3.5 mm <External Characteristics Evaluation Method after Sealing> (Evaluation of Presence or Absence of Occurrence of Delamination in Appearance when Deep Molding was Performed)

As deep depth molding, deep-drawing was performed on the molding packaging material using the above-described deep-drawing tool into a generally rectangular parallelepiped shape (approximately rectangular parallelepiped shape with one surface opened) of 55 mm in length×35 mm in width×5 mm. At this time, the heat-resistant resin layer 2 was molded so that it was arranged outside the molded article. Two molded articles were prepared for each Example and each Comparative Example, and the flange portions (sealing peripheral portions; see FIG. 2) 29 of the two molded articles 10 were contacted and superimposed to be heat sealed for 170° C.×6 seconds. Thereafter, the presence or absence of occurrence of delamination (separation) in the heat seal portion 39 and the presence or absence of floating in appearance were examined by visual observation, and were evaluated based on the following determination criteria.

(Determination Criteria)

"○": Delamination (separation) was not observed, and no floating was observed in appearance (Passed)

"Δ": Slight delamination (separation) slightly occurred, but there was essentially no delamination (separation) and no floating was observed in appearance (Passed)

"X": Delamination (separation) occurred and floating was observed in appearance (Failed)

<Heat Resistance Assessment Method>

The molding packaging material was cut into a strip of 15 mm in width×100 mm in length to form a test piece. Two test pieces were created, and the two test pieces were superimposed so that the inner layers (heat fusible resin layer) 3 were contacted each other, and heat sealed entirely (entire region) to form a heat-sealed portion (heat seal). The heat seal was performed using a heat-sealing device (TP-701-A) manufactured by Tester Industry Co., Ltd., at a heat-sealing pressure of 0.2 MPa (displayed gauge pressure) at 225° C. for 2 seconds. The surface of the heat-sealed portion was observed and evaluated based on the following determination criteria.

(Determination Criteria)

"○": There was no unchanged (Passed)

"Δ": Fine wrinkles were occurred (Passed)

"X": Whitening occurred on the surface or fusion occurred (Failed)

As is apparent from the Table, the molding packaging material of Examples 1 to 14 of the present invention had excellent formability without causing pinholes or cracks when performed deep molding, and could prevent occurrence of delamination when performed deep molding and was excellent in heat resistance.

On the other hand, in Comparative Examples 1 to 11 which deviated from the scope of claims of the present invention, it was evaluated such that at least one evaluation was "X" (Failed).

INDUSTRIAL APPLICABILITY

The molding packaging material according to the present invention is preferably used, for example, as a molding packaging material suitably used as a case for notebook PC, mobile phone, automotive, or stationary rechargeable batteries (lithium-ion rechargeable batteries), and also preferably used as a packaging material for foods and pharmaceutical products, but not specifically limited to these applications. In particular, it is especially preferably used as a battery packaging material.

The power storage device packaging case according to the present invention is preferably used, for example, as a packaging case suitably used as a case for notebook PC, mobile phone, automotive, or stationary rechargeable batteries (lithium-ion rechargeable batteries), but not specifically limited to these applications.

This application claims priority to Japanese Patent Application No. 2017-176419 filed on Sep. 14, 2017, the entire disclosure of which is incorporated herein by reference in its entirety.

The terms and descriptions used herein are used to describe embodiments of the present invention, and the present invention is not limited thereto. The present invention permits any design change as long as it is within the scope of claims and does not deviate from the spirit thereof.

DESCRIPTION OF SYMBOLS

1: molding packaging material
2: polybutylene terephthalate layer (outer layer)
3: heat fusible resin layer (inner layer)
4: metal foil layer
5: outer adhesive layer
6: inner adhesive layer
10: packaging case
15: packaging member
30: power storage device
31: power storage device main parts

The invention claimed is:

1. A molding packaging material comprising:
a polybutylene terephthalate layer consisting of a polybutylene terephthalate resin only as an outer layer;
a heat fusible resin layer as an inner layer; and
a metal foil layer arranged between the polybutylene terephthalate layer and the heat fusible resin layer,
wherein the polybutylene terephthalate layer and the metal foil layer are bonded via an outer adhesive layer,
wherein the outer adhesive layer is formed of a cured film of a urethane adhesive containing polyester polyol, a polyfunctional isocyanate compound, and a polyhydric alcohol,
wherein the polyester polyol contains a dicarboxylic acid component,
wherein the dicarboxylic acid component contains aromatic dicarboxylic acid, and a content rate of the aromatic dicarboxylic acid in the dicarboxylic acid component is 40 mol % to 80 mol %,
wherein Young's modulus of the cured film of the urethane adhesive is 170 MPa to 240 MPa,
wherein tensile strength of the polybutylene terephthalate layer is 180 MPa to 190 MPa in a MD direction and 180 MPa to 190 MPa in a TD direction, and
wherein a number average molecular weight of the polyester polyol is in a range of 8,000 to 30,000.

2. The molding packaging material as recited in claim 1, wherein the number average molecular weight of the polyester polyol is in a range of 10,000 to 26,000.

3. The molding packaging material as recited in claim 1, wherein the outer adhesive layer includes at least one bond selected from the group consisting of a urethane bond, an ester bond, a urea bond, an allophanate bond, a biuret bond, and an amide bond.

4. The molding packaging material as recited in claim 1, wherein in the urethane adhesive, a ratio (equivalence ratio) of a mol number of an isocyanate group of the polyfunctional isocyanate compound to a mol number of a hydroxyl group of the polyester polyol is 2 to 25.

5. A power storage device packaging case composed of a molded article of the molding packaging material as recited in claim 1.

6. A power storage device comprising:
a power storage device main parts; and
a packaging member comprising at least the power storage device packaging case as recited in claim 5,
wherein the power storage device main parts is packaged with the packaging member.

7. A method of producing a molding packaging material according to claim 1, comprising:
a process of preparing a laminate comprising a polybutylene terephthalate layer consisting of a polybutylene terephthalate resin only as an outer layer, a heat fusible resin layer as an inner layer, and a metal foil layer arranged between the polybutylene terephthalate layer and the heat fusible resin layer, wherein the polybutylene terephthalate layer is formed of a polybutylene terephthalate film having tensile strength of 180 MPa to 190 MPa in an MD direction and 180 MPa to 190 MPa in a TD direction, the heat fusible resin layer and the metal foil layer are bonded via a curing type inner adhesive, and the polybutylene terephthalate layer and the metal foil layer are bonded via a curing type outer adhesive containing polyester polyol, a polyfunctional isocyanate compound, and a polyhydric alcohol; and
an aging treatment process of curing the curing type inner adhesive and the curing type outer adhesive by subjecting the laminate to a heat aging treatment at a temperature of 37° C. to 55° C.,
wherein the polyester polyol contains a dicarboxylic acid component,
wherein the dicarboxylic acid component contains aromatic dicarboxylic acid, and
wherein a content rate of the aromatic dicarboxylic acid in the dicarboxylic acid component is 40 mol % to 80 mol %.

8. The molding packaging material as recited in claim 1, wherein tensile strength of the polybutylene terephthalate layer is 190 MPa in a MD direction and 180 MPa in a TD direction.

9. The method of producing a molding packaging material according to claim 8, wherein the polybutylene terephthalate layer is formed of a polybutylene terephthalate film having tensile strength of 190 MPa in an MD direction and 180 MPa in a TD direction.

* * * * *